United States Patent
Swenson et al.

(10) Patent No.: US 7,697,125 B2
(45) Date of Patent: Apr. 13, 2010

(54) SCANNING LADAR WITH ADJUSTABLE OPERATIONAL PARAMETERS

(75) Inventors: James W. Swenson, Minneapolis, MN (US); Mark D. Ray, Burnsville, MN (US); Malcolm B. McIntosh, Rochester, MN (US); Clinton T. Meneely, Burnsville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 11/747,560

(22) Filed: May 11, 2007

(65) Prior Publication Data

US 2008/0278715 A1 Nov. 13, 2008

(51) Int. Cl.
*G01B 11/26* (2006.01)
(52) U.S. Cl. .................................. 356/141.5
(58) Field of Classification Search ....... 356/3.01–3.15, 356/4.01–4.1, 5.01–5.15, 6–22, 28, 28.5
See application file for complete search history.

(56) References Cited

U.S. PATENT DOCUMENTS

| | | | | |
|---|---|---|---|---|
| 3,961,329 A | * | 6/1976 | Naidich | 342/142 |
| 5,371,581 A | * | 12/1994 | Wangler et al. | 356/5.01 |
| 2007/0008514 A1 | * | 1/2007 | Krasutsky | 356/4.01 |
| 2007/0052947 A1 | * | 3/2007 | Ludwig et al. | 356/4.01 |
| 2007/0263202 A1 | * | 11/2007 | Ohtomo et al. | 356/4.01 |
| 2007/0279615 A1 | * | 12/2007 | Degnan et al. | 356/4.01 |

FOREIGN PATENT DOCUMENTS

| | | |
|---|---|---|
| WO | 9852089 | 11/1998 |
| WO | 03098260 | 11/2003 |

OTHER PUBLICATIONS

Partial Search Report for European Patent Application No. 08251643.6, mailed Oct. 1, 2008.

* cited by examiner

*Primary Examiner*—Thomas H Tarcza
*Assistant Examiner*—Luke D Ratcliffe
(74) *Attorney, Agent, or Firm*—Kevin O'Brien and Calfee, Halter & Griswold LLP

(57) ABSTRACT

A LADAR has adjustable operational parameters to accommodate surveillance of a particular site. The LADAR includes a controller, a laser source governed by the controller to generate a laser beam pulsed at a pulse repetition rate, an optical scanner, a first set of optics, a first drive assembly governed by the controller, a second drive assembly governed by the controller, a light detector, a second set of optics for guiding laser echo pulses, and a processor coupled to the light detector to accommodate surveillance of the particular site.

23 Claims, 6 Drawing Sheets

SCANNING LADAR WITH ADJUSTABLE OPERATIONAL PARAMETERS

BACKGROUND

The present invention is directed to scanning laser radars (LADARs), in general, and, more particularly, to a scanning LADAR with adjustable operational parameters to accommodate laser perimeter surveillance of a particular site.

Generally, in laser perimeter security systems, a scanning LADAR is disposed at a particular site for surveillance of a perimeter of the site for observing intruders seeking unauthorized access to the site. For example, a scanning LADAR may be mounted on the top of a tower at a military base or airport to scan a predetermined Field of Regard (FOR) of the perimeter thereof to render awareness of potential intruders. Other examples of site applications may include a grounded helicopter or a vehicle, like a Humvee. For the most part, these scanning LADARs include a laser which generates a beam pulsed at a repetition rate which is dependent on a maximum range. The laser is configured to scan the pulsed laser beam over a FOR generally including both an azimuth scan angle and an elevation scan angle. At each laser position in the scan, the pulsed laser beam illuminates a spot on the FOR. The scan time is the time the LADAR takes to completely scan the FOR, and the scan rate is the number of times the FOR is completely scanned per unit time. Laser return pulses from the illuminated spots on the FOR are received by the LADAR and processed according to time of flight calculations to range map the landscape of the surrounding terrain and detect intruders.

For pulsed LADAR systems in which each transmitted laser pulse can not be uniquely identified from another, pulse returns associated with each transmitted laser pulse must reach the LADAR before the next laser pulse is transmitted. This is necessary in order to prevent confusing laser pulse returns from subsequent transmitted pulses and, thus, properly perform the time of flight range mapping calculations.

Current scanning LADAR systems are manufactured with one set of operating parameters that may not be changed. The scanning laser parameters typically fixed at manufacture are the laser pulse repetition rate, the azimuth scan angle and rate and the elevation scan angle and rate. Accordingly, these scanning LADAR systems may not be able to accommodate the security and perimeter terrain surveillance requirements of the different installation sites.

SUMMARY

A LADAR has adjustable operational parameters to accommodate surveillance of a particular site. The LADAR includes a controller, a laser source governed by the controller to generate a laser beam pulsed at a pulse repetition rate, an optical scanner, a first set of optics for guiding the pulsed laser beam from the laser source to the optical scanner, a first drive assembly governed by the controller for operating the optical scanner to direct the pulsed laser beam through an azimuth field of regard, a second drive assembly governed by the controller for operating the optical scanner to direct the pulsed laser beam through an elevation field of regard, a light detector, a second set of optics for guiding laser echo pulses returned from the azimuth and elevation fields of regard to the light detector which converts the laser echo pulses into electrical echo pulses representative thereof, and a processor coupled to the light detector for receiving the electrical echo pulses and operative to process the electrical echo pulses to generate a range map of the combined azimuth and elevation fields of regard to accommodate surveillance of the particular site.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

FIGS. 2 and 2A illustrate an example of combined azimuth/elevation scanning to illuminate a desired FOR or frame of a LADAR in accordance with one embodiment of an apparatus illustrating principles of the present invention;

FIG. 3A illustrates electrical pulses in one embodiment of the present invention;

DETAILED DESCRIPTION OF ILLUSTRATED EMBODIMENT

The present embodiment permits adjustment of the operating parameters of a scanning LADAR system as will become more evident from the following detailed description. For example, in some installation site terrains, a long LADAR range may not be possible due to natural geographic blockage of the transmitted laser beam. Consequently, with some adjustment of the present embodiment to render a faster laser pulse repetition rate, i.e. shorter inter-pulse period for receiving laser return pulses, a shorter LADAR range may be accommodated. This adjustment, in turn, may permit a faster laser scan time for a given FOR or a larger FOR for a given laser scan time. Accordingly, by implementing an adjustable laser pulse repetition rate and azimuth and elevation scan mechanisms in the present embodiment, the LADAR scan performance may be optimized for the terrain of each installation site under surveillance.

In one example, assuming the scanning LADAR of the present embodiment is mounted at some fixed distance from the ground at the installation site, the LADAR range/laser pulse repetition rate may be traded off against scan elevation range. Thus, for a closer range horizon/faster pulse repetition rate, a larger scan elevation range may be used while keeping the FOR scan time constant, and, similarly, for a larger range horizon/slower laser pulse repetition rate, a smaller elevation scan range may be used.

Figure 1:
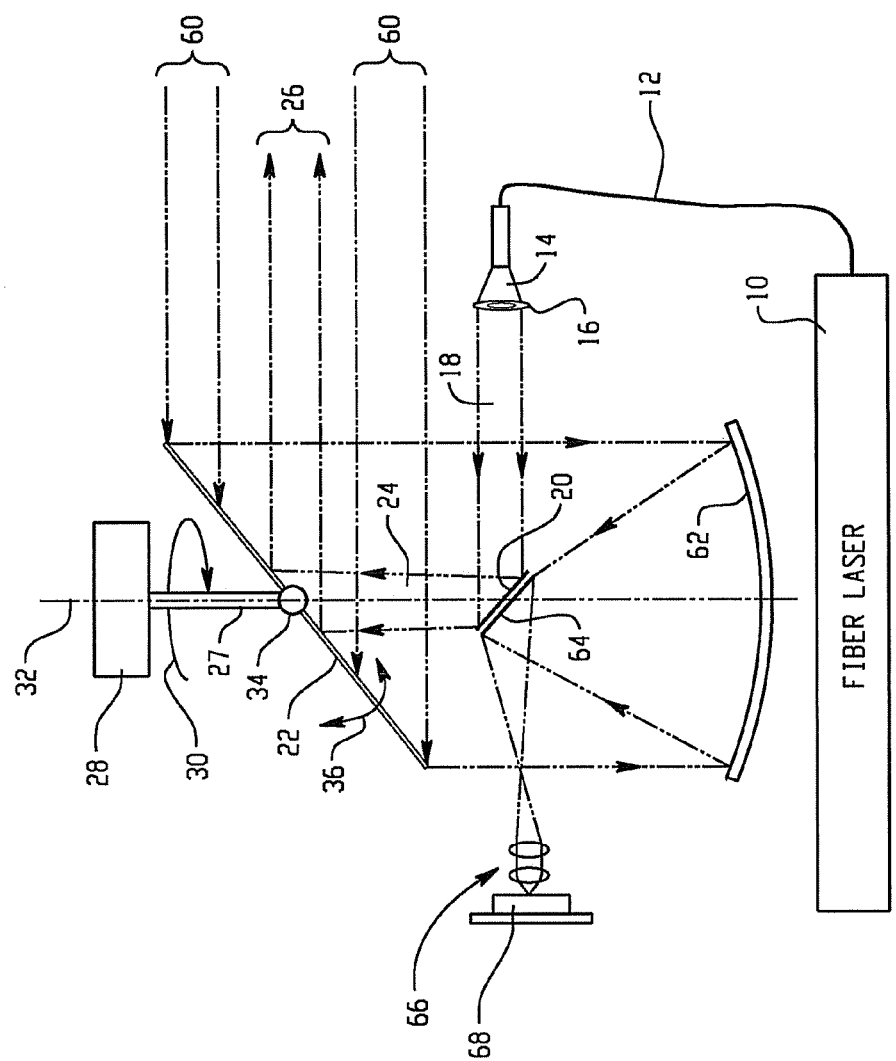
FIG. 1 is a cross-sectional illustration of laser optics in an exemplary scanning laser suitable for use in an embodiment of an apparatus illustrating principles of the present invention.

FIG. 1 is a cross-sectional illustration of the laser optics of an exemplary scanning laser suitable for use in the present embodiment. Referring to FIG. 1, a pulsed laser source 10, which may be a fiber laser, for example, transmits a laser beam pulsed at a pulse repetition rate over a laser pigtail fiber cable 12. In the present embodiment, the wavelength of the pulsed laser beam may be in the eye safe range around 1.54 microns, but it is understood that other wavelengths may work just as well. The pulsed laser beam exits the fiber cable 12 at point 14 with a beam divergence angle on the order of 25 degrees, for example, and is collimated by a lens 16 disposed at a distance from the exit point 14. The lens 16 directs the collimated pulsed beam along an optical path 18 to a fold or turning mirror 20 which reflects the transmitted beam to an optical scanner which may comprise a flat scan mirror 22 along an optical path 24. The transmitted pulsed laser beam is reflected from the mirror 22 along an optical path 26 to a point on the intended FOR as will become more evident from the description of FIGS. 2 and 2A herebelow.

In one embodiment, the scan mirror 22 is mechanically connected by a linkage 27 to an azimuth scan drive motor 28 that is operative to internally scan the mirror 22 through an angle in azimuth, for example, as illustrated by the arrowed line 30 about an axis 32. This motion of the mirror 22 causes the transmitted pulsed laser beam to scan the FOR 360° in azimuth. The scan mirror 22 may be also mechanically linked to an elevation scan drive motor 34 which is operative to internally scan the mirror 22 through a total range of elevation angles which may be adjustable from 2.5° to 10°, for example, as illustrated by the arrowed line 36 about an axis perpendicularly to the drawing sheet. This motion of the mirror 22 causes the transmitted pulsed laser beam to scan the FOR in elevation at the adjusted angle. In the present embodiment, the elevation mechanical linkage might be linked to the azimuth mechanical linkage 27 through a gearing mechanism to permit the azimuth and elevation scans to occur simultaneously. In most cases, the linkage is through software that controls independent azimuth and elevation drives. So, while the mirror 22 is scanned in azimuth, it may also be scanned in elevation to form the desired FOR of the LADAR system.

Figure 2:
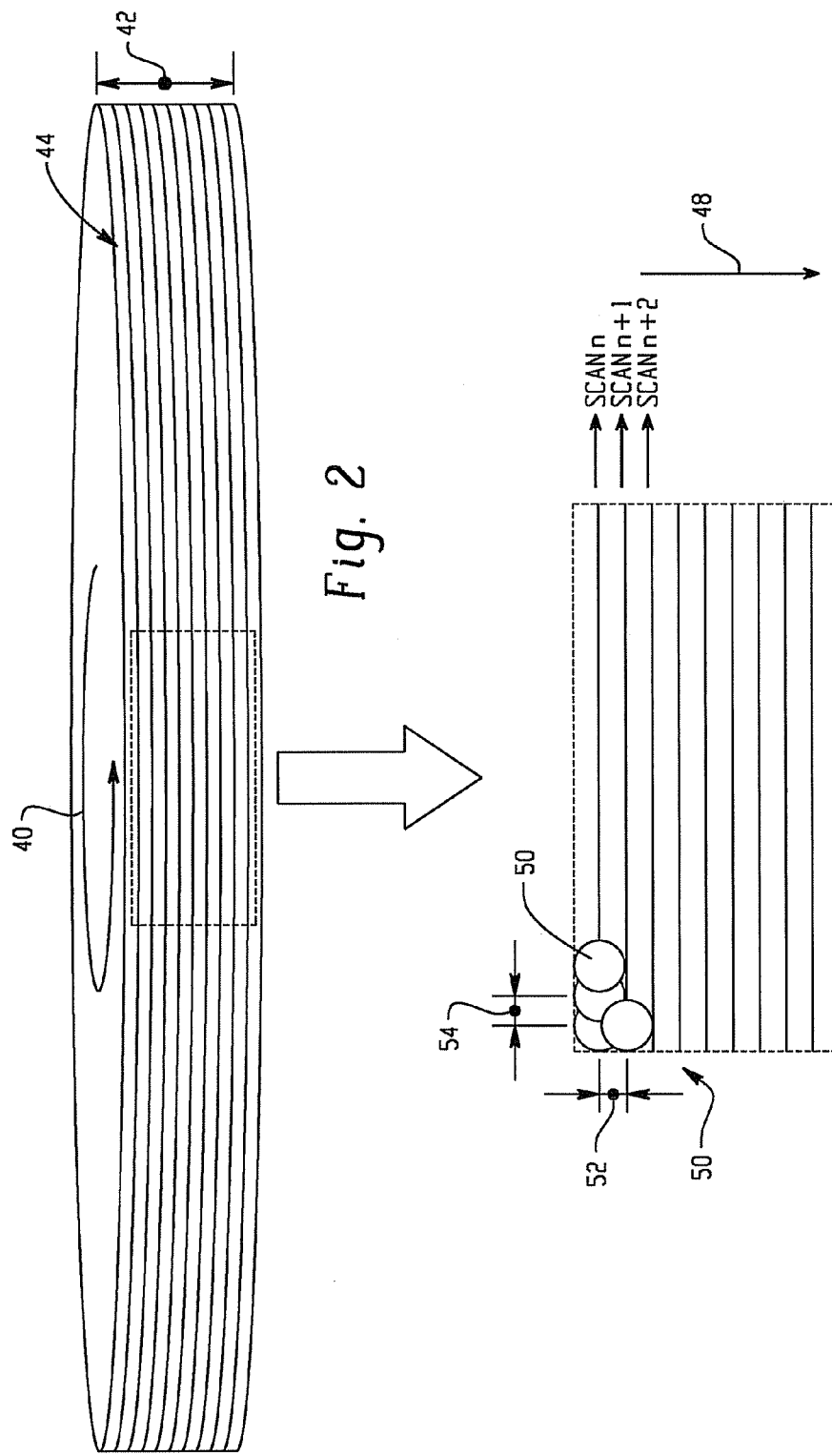

An example of this combined azimuth/elevation scanning to illuminate the desired FOR or frame of the LADAR is illustrated in FIGS. 2 and 2A. FIG. 2 is an isometric view of a 360° azimuth laser beam scan shown by the arrowed line 40 which is representative of the horizontal FOR of the frame. In FIG. 2, the vertical FOR is shown by the arrowed line 42. In the present embodiment, the scan mirror 22 may be controlled to reflect the laser beam in elevation with a linear sawtooth pattern which may start at a vertical angle 0° and scan through a full range of elevation angles centered about this starting position. This angular range may be adjusted from 2.5° to 10°, for example. As the mirror 22 is vertically scanned from zero to the maximum vertical angle, it may also go though multiple azimuth scans, such as 88, for example. The scan of the pulsed laser beam in azimuth during an elevation sawtooth scan is represented by the lines 44 in FIG. 2.

An example of a resulting scan frame of the FOR is shown in the two-dimensional illustration of FIG. 2A which is taken from the isometric view of FIG. 2. In FIG. 2A, the azimuth or horizontal scans are depicted by the lines n, n+1, n+2, . . . etc. descending from top to bottom in accordance with the linear vertical scan 48 and the pulsed laser beam illuminations of the FOR are depicted by the circles 50 along the scan lines. The spaces 52 between the horizontal scan lines represent the vertical spacing of the scan in degrees and the distances 54 between the beams 50 represent the horizontal spacing of the scan in degrees. Note that the pulsed beam illuminations 50 may overlap each other to provide a more complete illumination fill factor of the FOR. Accordingly, once the scan mirror 22 is controlled through a complete azimuth/elevation scan, the transmitted laser beam pulses will have spot illuminated the desired FOR as illustrated by FIG. 2A. The time the mirror 22 takes to complete a frame of the FOR is considered the frame time of the LADAR.

Returning to FIG. 1, with each transmitted beam illumination 50 in the FOR, echo laser pulses 60 are generated back to and received by the LADAR at mirror 22. Mirror 22 reflects the laser return or echo pulses 60 to a parabolic shaped mirror 62 which is configured to focus the return pulses to another flat mirror 64. In turn, mirror 64 reflects the return pulses to conditioning optics 66 which focus the return pulses onto a light detector 68 which may be an avalanche photodiode, for example. The detector 68 converts the received laser return pulses into electrical signals representative thereof for use in the mapping of the terrain of the FOR and identifying potential intruders.

Figure 3:
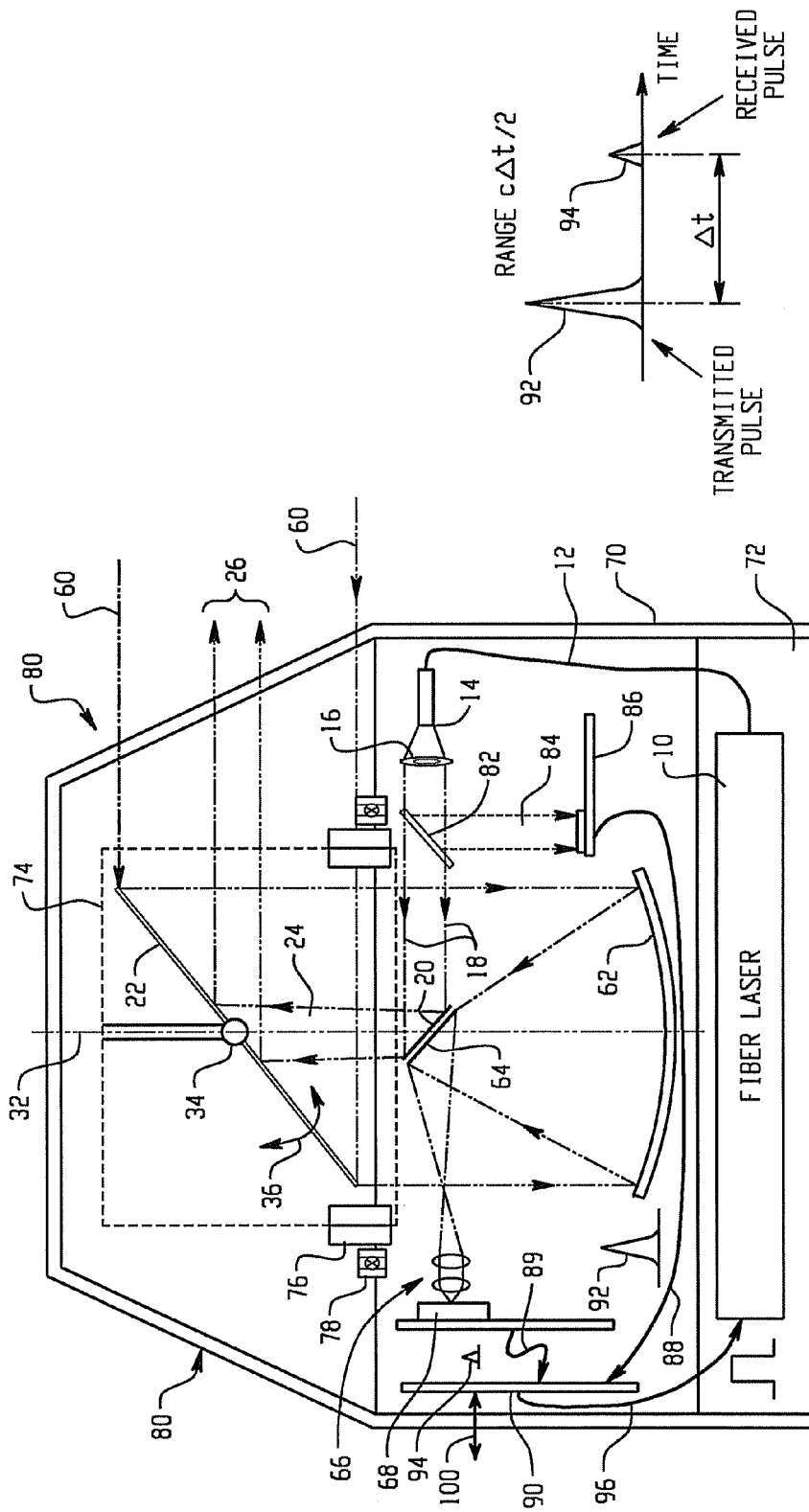
FIG. 3 is a cross-sectional illustration of one embodiment of a LADAR incorporating the exemplary laser optics of the scanning laser of FIG. 1.

FIG. 3 is a cross-sectional illustration of a LADAR incorporating the exemplary laser optics of the scanning laser of FIG. 1 disposed in a housing 70. The reference numerals of the optical elements described for the embodiment of FIG. 1 and used in the exemplary LADAR of FIG. 3 will remain the same without further explanation unless needed for the description of the LADAR represented in FIG. 3. Referring to FIG. 3, the optical scanning laser configuration described in connection with FIG. 1 may be enclosed in a housing 70 which may include a plenum, chamber 72, for containing the laser source 10 to dissipate heat from the laser 10 should the need arise. In addition, the high speed azimuthal scan mirror 22 and its associated scan mechanisms may be contained in a cylindrical volume within the housing 70 shown by the dashed lines 74.

In the LADAR embodiment of FIG. 3, the azimuth scan drive motor 22 is replaced with a torque ring motor 76 and associated ring bearing 78 disposed about the perimeter of the chamber 74 within the housing 70 for rotating the chamber 74 and the scan mirror assembly contained therein in azimuth. The chamber 74 may include translucent surfaces to permit the transmitted laser beam along paths 24 and 26 and the laser echoes along paths 60 to pass therethrough. To accommodate the passage of the transmitted laser beam 26 from the housing 70 to the FOR and reception of the return echoes 60 by the housing 70, a window area 80 that is transparent to the laser wavelength used may be provided about the top periphery of the housing 70 surrounding the chamber 74. In this configuration, the pulsed laser beam may be transmitted and echoes received there from 360° in azimuth. The window area 80 should be large enough to also accommodate the maximum elevation scan angle of the laser beam. In another embodiment, the window area is translucent.

The embodiment of FIG. 3 includes some additional elements like a partial reflector mirror 82 which may be disposed in optical path 18 to reflect a small portion of the transmitted laser beam over path 84 to another light detector 86 which may also be an avalanche diode, for example. The detector 86 is operative as a laser trigger monitor to convert each transmitted laser pulse to an electrical signal (see pulse 92 in FIG. 3A) which may be conducted over a signal line 88 to processor electronics shown within the housing 70 at 90. As noted above, received echo pulses associated with each transmitted laser pulse are converted into electrical pulses (see pulse 94 in FIG. 3A) by the light detector 68. In the present embodiment, these electrical echo pulses are conducted over a signal line 89 to the processor electronics 90.

The processor electronics 90 use each electrical trigger pulse 92 it receives over line 88 and each associated electrical echo pulse 94 it receives over line 89 in the time of flight range mapping calculations for the FOR as shown in FIG. 3A. The processor 90 may also control the pulse repetition rate of the laser source 10 by conducting a control signal thereto over line 96 which will become more evident from the description found herein below. The processor 90 may also conduct gathered and processed information to a network outside of the LADAR over signal lines 100.

Figure 4:
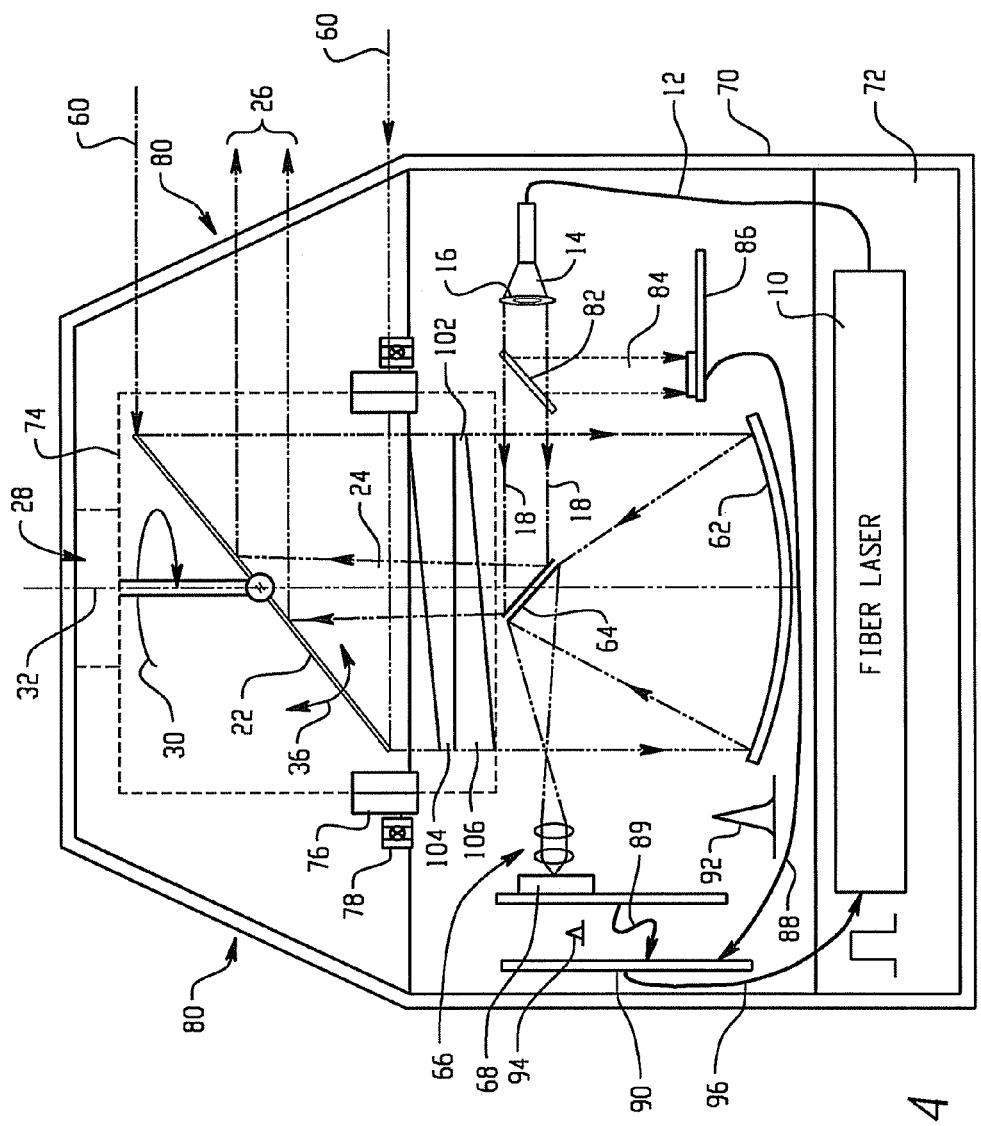
FIG. 4 is a cross-sectional illustration of a LADAR for use in another embodiment of an apparatus illustrating principles of the present invention.

In an alternate embodiment of the LADAR shown in the cross-sectional illustration of FIG. 4, the optical scanner may include a Risley prism pair assembly 102 which may be disposed in the optical path 24 within the chamber 74 for rotation therewith. In this embodiment, the elevation scan drive motor 34 may be eliminated. The Risley prism assembly 102 may include internal drive motors for rotating the pair of prisms along with the scan mirror but at slightly faster and slower speeds, respectively. Thus both Risley prisms rotate nominally with the scan mirror but in this rotating frame of reference, they rotate counter to one another. The entire assembly 102 is rotated in azimuth with the scan mirror 22. For example, one prism 104 of the Risley prism assembly 102 may be rotated clockwise at the scan mirror speed plus a small speed differential and the other prism 106 thereof may be rotated in the same direction at the scan mirror speed less the same differential. The effective counter-rotation of the prisms within this rotating frame of reference creates an elevation scan of the laser beam reflected from the scan mirror 22. The magnitude of this elevation scan depends on the wedge angle and index of refraction of the Risley prisms. The elevation scan has a sinusoidal slope dependent on the difference in rotational speeds of the rotating prisms 104 and 106. This slope could also be made linear by controlling the instantaneous differential speed as a function of the relative angles of the two Risley prisms. In addition, by reversing the directions of the differential speeds at given relative angles, the elevation scan can be restricted to any desired range within the maximum and minimum angles achievable by the Risley prism pair. Note that to achieve the scan pattern of the FOR described in connection with FIGS. 2 and 2A hereabove, the incremental rotational speed of the prisms 104 and 106 with respect to each other is substantially smaller than the azimuth scan rate of mirror 22, approximately 1:88, for example.

In the alternate embodiment depicted in FIG. 4, the chamber 74 and the torque ring motor 76 and ring bearing 78 assembly may also be replaced with the azimuth scan drive motor 28 described in connection with the embodiment of FIG. 1. In such an embodiment, the motor 28 may be disposed at the internal top surface of the housing 70 and mechanically linked to the scan mirror 22 and Risley prism assembly 102 for simultaneous azimuth rotation thereof about axis 32. The assembly 102 will have its internal drive motors for counter-rotating the prisms 104 and 106 with respect to each other as noted above.

Figure 5:
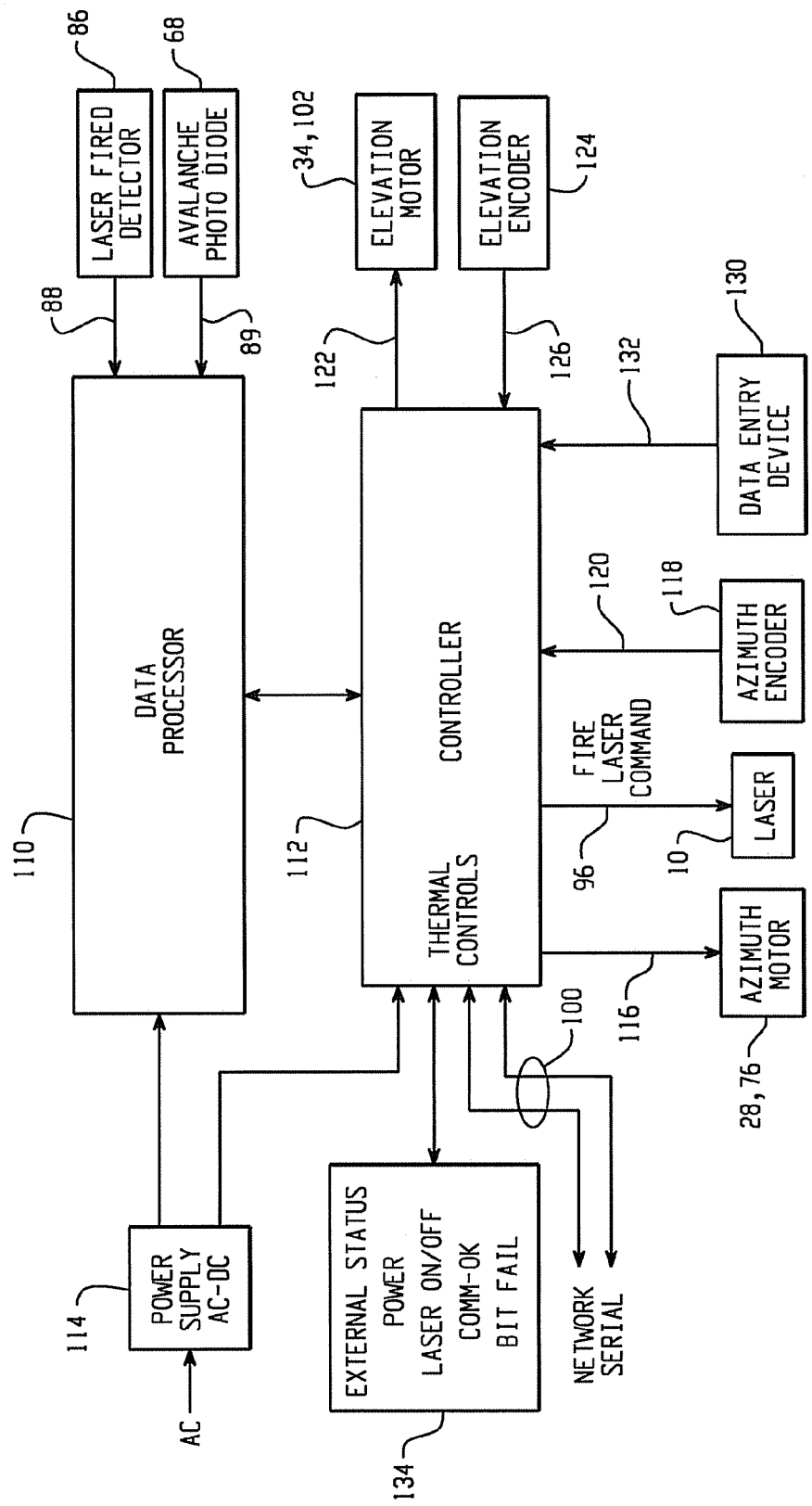
FIG. 5 is a block diagram schematic illustrating an exemplary embodiment of processing electronics in one embodiment of the present invention.

All of the LADAR embodiments described hereabove may include processing electronics 90 for controlling the operations thereof. The block diagram schematic of FIG. 5 depicts an exemplary embodiment of such processing electronics. Referring to FIG. 5, the processing electronics may include both a data processor 110 and a controller 112, for example. Both may be powered from an AC-DC power supply converter 114. While the data processor 110 and controller 112 are described in the present embodiment as two separate units, it is understood that their operations may be integrated into a single unit just as well. As described above, the processor 110 receives trigger pulse data from the detector 86 over line 88 and echo pulse data from the detector 68 over line 89. The data processor 110, which may be a programmed microprocessor, for example, is operative to perform the operations associated with gathering the laser pulse data received from detectors 86 and 68, range mapping the FOR using time of flight calculations according to a scan rate using the gathered pulse data and detecting potential intruders from such mappings. The data processor 110 may interact with the controller 112 to obtain certain laser beam positioning data for each pulse, which will become more evident from the following description, for use in the FOR range mapping processing.

The controller 112 may interact with the processor 110 and is operative to gather laser beam position data and to control the various components of the LADAR which have been described above in connection with the embodiments of FIGS. 1-4. For example, the controller 112 is operative to control the pulse repetition rate of the laser source 10 by issuing fire laser commands over signal line 96 thereto. Each issued fire laser command will cause the laser source 10 to transmit a laser pulse as noted above. The controller 112 is also operative to control the azimuth drive motor, be it motor 28 or motor 76, using a signal line 116 and receive azimuth position data by monitoring an azimuth position encoder 118 using signal line 120. The encoder 118 may be integrated into the azimuth drive motor 28, 76 or disposed at or in proximity to a drive axle thereof for measuring the azimuth rotational position of the laser beam with each pulse thereof. Similarly, the controller 112 is operative to control the elevation drive motor, be it motor 34 or Risley prism assembly 102, using a signal line 122 and receive elevation position data by monitoring an elevation position encoder 124 using signal line 126. The encoder 124 may be integrated into the elevation drive assembly 34, 102 or disposed at or in proximity to a drive axle thereof for measuring the elevation position of the laser beam with each pulse thereof.

A data entry device 130, which may be a personal computer (PC), for example, may be connected via lines 132 to the controller 112 for entry of certain data used in the adjustment of the scan rate of the LADAR as will become better understood from the following description. In addition, the processing electronics may include certain sensors represented by block 134 to identify the operational status of the components of the LADAR. For example, one status may indicate whether power is properly applied to the LADAR. Other status indicators may be whether the laser 10 is on or off, whether the communication to and from the network over line 100 is proper, and whether there has been a Built-in-Test (BIT) failure, for example.

In operation, the controller 112 may control the pulse repetition rate of the laser source 10 and cause the pulsed laser beam 26 to scan through the FOR in azimuth and elevation in a similar manner as described in connection with the illustrations of FIGS. 2 and 2A. With each laser pulse transmitted, the data processor 110 may obtain the azimuth and elevation positions from the controller 112 and gather the return pulse(s) associated therewith as noted above. Accordingly, the data processor 110 may perform time-of-flight calculations for each laser pulse and determine the range, azimuth and elevation data associated therewith for range mapping the FOR for each scan. A potential intruder within the FOR may be determined by comparing the mapping of scans with each other. The scan rate may be determined by the controller 112 according to data entered via the data entry device 130 and the performance of a predetermined algorithm. An example of such an algorithm is depicted in the flow chart of FIG. 6 within the dashed lines.

Figure 6:
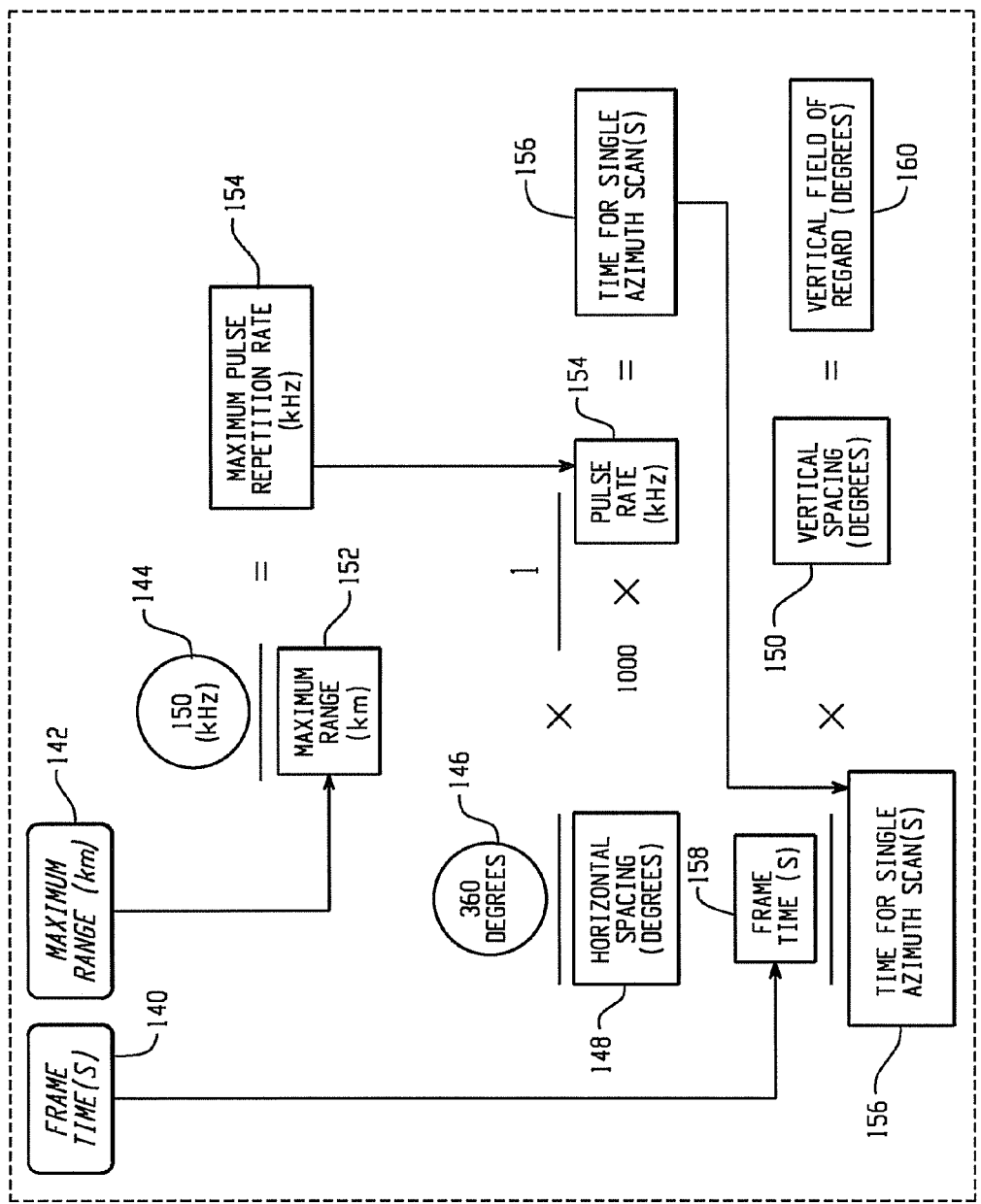
FIG. 6 illustrates a flow chart of an example algorithm for determining scan rate in accordance to one embodiment of the present invention.

Referring to FIGS. 2, 2A and 6, data may be entered into the controller 112 via the data entry device 130 in the form of a frame time (block 140) and a maximum range (block 142), preferably in kilometers. The frame time is the time desired for each scan of the FOR which is determined based oil the particular site under surveillance and how often a scan of the FOR is to be updated. This time is generally under five seconds and preferably is around one second. The maximum range is based on the surrounding landscape of the particular site and is generally considered a measure of the longest line of sight of the LADAR in its position at the site. Other possible data which may be entered into the controller 112 for the purposes of executing the algorithm for a particular LADAR embodiment are: the maximum pulse repetition rate of the laser source 10 for a range of one kilometer (shown at block 144) which is one hundred and fifty kilohertz (150 kHz), for example; the desired azimuth scan or FOR, in degrees, of the LADAR (shown in block 146) which may be 360° for the present embodiment (see FIG. 2); the horizontal or azimuth spacing 54 of the laser pulses, in degrees (see block 148); and the vertical or elevation spacing 52 of the azimuth scan lines, in degrees (see block 150).

Once all of the data are entered, the exemplary algorithm of FIG. 6 may be executed to perform the calculations for use in determining the scan rate of the LADAR for a particular site. A first calculation includes dividing the data of block 144 with the entered maximum range in kilometers at block 152 to obtain a maximum pulse repetition rate in kilohertz (kHz) for the LADAR at block 154 which may be used in a subsequent calculation.

A next calculation of the algorithm may include dividing the azimuth FOR (360°) 146 by the desired horizontal spacing 148 and further dividing the result by the maximum pulse repetition rate 154 multiplied by one thousand to obtain the time for a single azimuth scan shown in block 156 which may be used in controlling the azimuth drive motor. A next calculation may include dividing the entered frame time (block 158) by the data of block 156 and multiplying the result by the desired vertical spacing 150 to obtain the vertical FOR 160, in degrees, for use in controlling the elevation drive motor. Once all of the operational settings are determined by the algorithm, the LADAR may operate at the particular site in an optimum manner.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A laser radar (LADAR) having adjustable operational parameters to accommodate surveillance of a particular site, said LADAR, comprising:

a controller;

a laser source governed by said controller to generate a laser beam pulsed at a pulse repetition rate based on a maximum range at the site;

an optical scanner;

a first set of optics for guiding said pulsed laser beam from said laser source to said optical scanner;

a first drive assembly governed by said controller for operating said optical scanner to direct said pulsed laser beam through an azimuth field of regard, the controller being operative to adjust an azimuth scan time based on the desired pulse repetition rate of the laser source;

a second drive assembly governed by said controller for operating said optical scanner to direct said pulsed laser beam through an elevation field of regard;

a light detector;

a second set of optics for guiding laser echo pulses returned from said azimuth and elevation fields of regard to said light detector which converts said laser echo pulses into electrical echo pulses representative thereof; and a processor coupled to said light detector for receiving said electrical echo pulses and operative to process said electrical echo pulses to generate a range map of the combined azimuth and elevation fields of regard to accommodate surveillance of said particular site;

the controller being operative to adjust the azimuth scan time based on a function of the azimuth field of regard, an azimuth spacing between laser pulses as the pulsed laser beam is directed through the azimuth field of regard, and the desired pulse repetition rate.

2. The LADAR of claim 1, further including:

a data entry device coupled to said controller for entering data into said controller which is operative, based on said entered data, to adjust operational parameters thereof in governing said laser source and first and second drive assemblies;

wherein the controller is operative to accept entered data of a maximum range for the LADAR at the particular site; and wherein based on the entered maximum range, the controller is operative to adjust the pulse repetition rate to a desired pulse repetition rate for governing the laser source.

3. The LADAR of claim 2, wherein:

the controller governs the first drive assembly to operate the optical scanner to direct the pulsed laser beam through a single scan of the azimuth field of regard at said azimuth scan time.

4. The LADAR of claim 3, wherein:

the controller is operative to accept entered data of a time frame for scanning the pulsed laser beam through both of the azimuth and elevation fields of regard; and based on the entered maximum range and time frame, the controller is operative to adjust the elevation field of regard for governing the second drive assembly.

5. The LADAR of claim 3, wherein:

the controller governs the first drive assembly to operate the optical scanner to direct the pulsed laser beam through multiple scans of the azimuth field of regard in a single scan of the elevation field of regard; and the controller is operative to adjust the elevation field of regard based on a function of the entered frame time, the adjusted azimuth scan time, and an elevation spacing between the multiple scans of the azimuth field of regard.

6. A method of operating a laser radar (LADAR) with adjustable operational parameters to accommodate surveillance of a particular site, said method comprising:

entering data based on said surveillance of the particular site, including a maximum range at the site, into said LADAR;

adjusting a pulse repetition rate as a function of said entered data including the maximum range at the site;

adjusting a single azimuth field of regard scan time of said LADAR as a function of the pulse repetition rate;

adjusting an elevation field of regard of said LADAR as a function of the entered data;

adjusting an azimuth spacing between laser pulses as a pulsed laser beam is directed through the azimuth field of regard;

generating a laser beam pulsed at said adjusted pulse repetition rate;

scanning said pulsed laser beam through the adjusted elevation field of regard;

scanning said pulsed laser beam through multiple azimuth fields of regard during said scan of the adjusted elevation field of regard, said pulsed laser beam being scanned through each azimuth field of regard at said adjusted single azimuth field of regard scan time;

receiving laser echo pulses returned from said azimuth and elevation fields of regard;

converting said received laser echo pulses into electrical echo pulses representative thereof; and processing said electrical echo pulses to generate a range map of the combined azimuth and elevation fields of regard to accommodate surveillance of said particular site.

7. The method of claim 6, wherein:

the step of entering data includes entering data of a maximum range for the LADAR at the particular site; and the step of adjusting includes adjusting the pulse repetition rate of the laser beam based on the entered maximum range.

8. The method of claim 7, wherein the step of adjusting the single azimuth field of regard also includes adjusting the single azimuth field of regard scan time based on the adjusted pulse repetition rate of the laser source.

9. The method of claim 8, wherein the single azimuth field of regard scan time is also adjusted based on a function of the azimuth field of regard, the azimuth spacing between laser pulses as the pulsed laser beam is scanned through the azimuth field of regard, and the adjusted pulse repetition rate.

10. The method of claim 6, wherein:

the step of entering data includes entering data of a time frame for scanning the pulsed laser beam through both of the azimuth and elevation fields of regard and a maximum range for the LADAR at the particular site; and the step of adjusting includes adjusting the elevation field of regard based on the entered maximum range and time frame.

11. The method of claim 10, wherein the elevation field of regard is also adjusted based on a function of the entered frame time, the adjusted single azimuth field of regard scan time, and an elevation spacing between the multiple scans of the pulsed laser beam through the azimuth field of regard.

12. A laser radar (LADAR) having adjustable operational parameters to accommodate surveillance of a particular site, said LADAR comprising:

a controller operative to adjust operational parameters of said LADAR to accommodate surveillance of said particular site;

a laser source governed by said controller to generate a laser beam pulsed at an adjustable pulse repetition rate based on a maximum range at the site;

an optical scanner;

a first set of optics for guiding said pulsed laser beam from said laser source to said optical scanner;

a first drive assembly governed by said controller for operating said optical scanner to direct said pulsed laser beam through an adjustable elevation field of regard;

a second drive assembly governed by said controller for operating said optical scanner to direct said pulsed laser beam through multiple azimuth fields of regard during said scan of the elevation field of regard, said pulsed laser beam being scanned through each azimuth field of regard at an adjustable single azimuth field of regard scan time, the controller being operative to adjust the azimuth scan time based on the desired pulse repetition rate of the laser source, and the controller being operative to adjust an azimuth spacing between laser pulses as the pulsed laser beam is directed through the azimuth field of regard;

a light detector;

a second set of optics for guiding laser echo pulses returned from said azimuth and elevation fields of regard to said light detector which converts said laser echo pulses into electrical echo pulses representative thereof; and a processor coupled to said light detector for receiving said electrical echo pulses and operative to process said electrical echo pulses to generate a range map of the combined azimuth and elevation fields of regard to accommodate surveillance of said particular site.

13. The LADAR of claim 12, wherein the optical scanner comprises a scan mirror for reflecting the pulsed laser beam through the azimuth and elevation fields of regard.

14. The LADAR of claim 13, wherein the second drive assembly comprises a motor mechanically linked to the scan mirror for rotating the scan mirror through the azimuth fields of regard.

15. The LADAR of claim 13, wherein the first drive assembly comprises a motor mechanically linked to the scan mirror for rotating the scan mirror through the elevation field of regard.

16. The LADAR of claim 13, wherein:

the optical scanner comprises a counter rotating Risley prism pair assembly disposed in an optical path of the pulsed laser beam between the first set of optics and the scan mirror; and the first drive assembly is operative to rotate the pair of Risley prisms in relation to each other to cause said scan mirror to reflect the pulsed laser beam through the elevation field of regard.

17. The LADAR of claim 16, wherein the scan mirror and Risley prism pair assembly are linked to rotate in azimuth together.

18. The LADAR of claim 13:

further including a cylindrical chamber;

wherein the scan mirror is disposed within the chamber to rotate in azimuth with said chamber; and wherein the second drive assembly comprises a torque ring motor disposed about said chamber for rotating said chamber and scan mirror disposed therein through the azimuth fields of regard.

19. The LADAR of claim 12, wherein each azimuth field of regard is three hundred and sixty degrees.

20. The LADAR of claim 1, wherein:

the controller sets a relatively higher pulse repetition rate for a relatively shorter maximum range at the site; and the controller sets a relatively faster azimuth scan time for a relatively higher pulse repetition rate.

21. The LADAR of claim 1, wherein:

the controller is operative to adjust an elevation scan time based on the azimuth scan time.

22. The LADAR of claim 1, wherein:

the laser pulse repetition rate and the combined azimuth and elevation fields of regard are based on a terrain of the site.

23. The LADAR of claim 16, wherein the Risley prism pair assembly is disposed in an optical path of the laser echo pulses.

* * * * *